United States Patent [19]
Kaye

[11] 3,716,708
[45] Feb. 13, 1973

[54] FLASHLIGHT WITH RESERVE CELL

[75] Inventor: Gordon E. Kaye, Irvington, N.Y.

[73] Assignee: P. R. Mallory & Co., Inc., Indianapolis, Ind.

[22] Filed: Aug. 17, 1970

[21] Appl. No.: 64,456

[52] U.S. Cl..................240/10.6 R, 136/90, 136/114
[51] Int. Cl...................................................F21l 7/00
[58] Field of Search.........136/114, 112, 113, 90, 162; 240/10.6 R

[56] References Cited

UNITED STATES PATENTS

| | | | |
|---|---|---|---|
| 2,624,767 | 1/1953 | Moulton | 136/113 |
| 2,763,706 | 9/1956 | Barrett | 136/112 |
| 2,783,291 | 2/1957 | Gold | 136/113 |
| 3,236,697 | 2/1966 | Amiet et al. | 136/162 |
| 3,575,726 | 4/1971 | Marsault | 136/90 |
| 2,368,697 | 2/1945 | Winckler | 136/113 |
| 2,909,587 | 10/1959 | Smedley | 136/112 |
| 3,257,243 | 6/1966 | Wild | 136/113 |

*Primary Examiner*—Winston A. Douglas
*Assistant Examiner*—C. F. LeFevour
*Attorney*—Robert Levine

[57] ABSTRACT

A reserve cell battery serves as a handle for a flashlight, made to be an economical throw-away unit to be discarded after the cell is used up.

7 Claims, 4 Drawing Figures

PATENTED FEB 13 1973
3,716,708
FIG.1
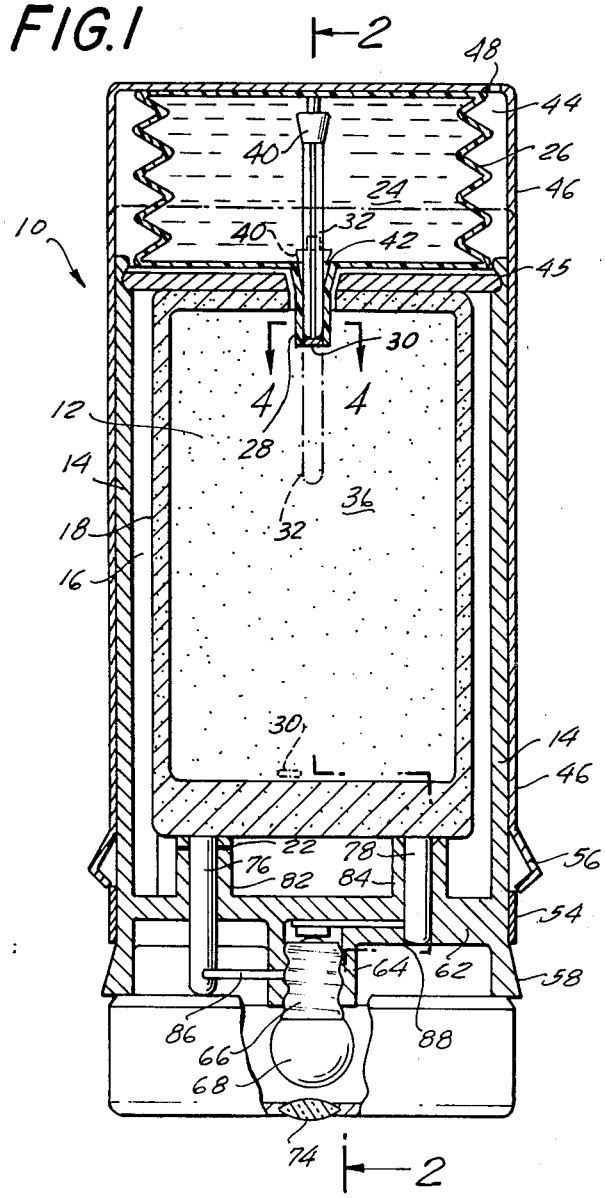
FIG.2
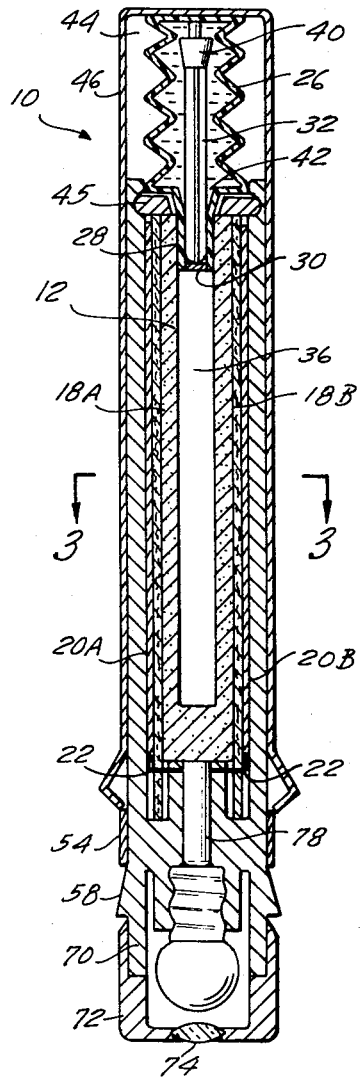
FIG.3
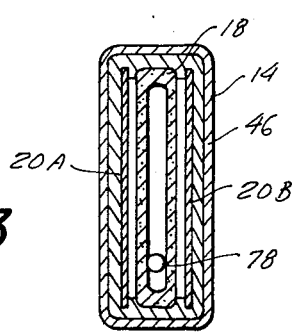
FIG.4
INVENTOR
GORDON E. KAYE
BY
[signature]
ATTORNEY

FLASHLIGHT WITH RESERVE CELL

This invention relates to an emergency type reserve cell device that may be normally kept and stored in unactivated condition, as for a flashlight, for example, by keeping the electrolyte isolated in a closed container, and separated from the anode-cathode cell structure until it is desired to utilize the cell, as for the flashlight, at which time the cell is activated and put into activated condition by releasing the electrolyte from its isolated condition and location, usually in a separate closed container, and by then permitting and forcing the electrolyte to enter the operating space between the anode and the cathode of the cell to serve as an active electrolyte between those electrodes and to enable the cell to function.

In conventional cases where a conventional battery cell is not immediately and currently being used, and is stored until its use is desired, the cell may not be called upon for use in service for substantial periods of time. In the meantime the cell is in an active state, with all the chemical components assembled, and internal chemical action may proceed in a way to cause internal deterioration of the cell as a battery, to such an extent as to render the battery at least partially depleted, with less voltage and power capacity than is desired and expected in a normal cell, even though the battery cell has not been used while standing idle.

The object of this invention is to provide a reserve battery cell which is normally kept unactivated, by keeping the electrolyte isolated in a container separated from the cathode-anode assembly, until the battery cell is to be utilized, at which time the electrolyte from the isolated container is released and introduced into the space between the cathode and the anode electrodes to activate the cell by providing an active ionizing and conducting medium between the two electrodes.

Another object of the invention is to provide a reserve type cell in which the electrolyte is confined in a collapsible container, such as a sealed bellows, so long as the battery cell is not to be placed in use, and the electrolyte is stored in the bellows while awaiting use, at which time the bellows is compressed by a suitable activating device to break the seal of the bellows and to force the electrolyte from the bellows into the operating space of the cell between the cathode and the anode to render the cell activated and ready to deliver electrical energy.

A specific application for which such a reserve cell is particularly desirable, is a flashlight, since a flashlight may be at rest and stored for a considerable length of time before it is called on for use, and, similarly, may be set aside again for a period of time before being called upon again for subsequent use.

Because of the chemical nature of the elements that are utilized in, and constitute an electric cell, particularly in the present cell which utilizes a caustic electrolyte, considerable chemical reaction can take place in the cell or battery while the device, such as a flashlight, is resting and is not being put to use. As a consequence, considerable energy may be wasted internally in the cell or battery, even though the battery is not being used, and, as a further consequence, the voltage of the battery may be reduced from its normal operating value, and be less than the full energizing voltage normally relied on to energize the lamp of the flashlight.

Another object of the invention is to provide a reserve cell battery, for a flashlight, to be inactive until called on for use.

Another object of the invention is to provide a battery of the reserve cell type in which the battery housing and an associated cover cap may be utilized as a handle for a flashlight.

In present conventional flashlights, the batteries are arranged to be replaceable when the energy of the batteries has been fully used. A separate container is conventionally provided to serve as the handle for the flashlight and as a container for the batteries. One of the features of this invention is to utilize the battery itself with its casing as a handle for the flashlight, and to make it economically, to thereby permit the flashlight structure to be discarded completely when the energy in the batteries has been fully utilized, and the battery would be discarded anyway.

Another object of the invention, therefore, is to provide a battery of the reserve cell type that is designed and constructed to be economical in manufacture, so that it may be sufficiently economical to be a discardable or throw-away unit when the energy of the battery is fully utilized.

Another feature of the invention is to provide a reserve battery, with a construction which permits and enables the battery to be activated and rendered electrically operative in one manual movement, for activating the cell of the battery, to render the flashlight immediately operative. A reserve cell battery constructed in accordance with this invention utilizes an elongated plastic housing compartment accommodating an anode and spacer and cathode assembly structure for an individual cell, to energize any suitable electrical device, which is shown here, merely by way of illustration, as consisting of the lamp of a flashlight. The cell is hermetically closed, and associated with it is an electrolyte reservoir, illustrated here in a preferred construction as a bellows, which connects with the operating space in the associated cell through a conduit that normally is closed to confine the electrolyte in said compressible bellows reservoir.

As long as the electrolyte is kept confined in its reservoir bellows container and is isolated from the anode-cathode space, the cell is in an unactivated condition, and no chemical reaction can occur, with the cell, that would reduce the effectiveness of the cell when it is called upon for service. When the bellows reservoir is compressed, a plunger, which is actuable upon compression of the bellows, serves to fracture a seal in the connecting conduit to the cell space, thereupon permitting the electrolyte to exit from the compressed bellows and to be forced into the cell by such compression of the bellows. Once the electrolyte enters its cell, it is absorbed by the porous spacer and depolarizer material that is normally disposed between the cathode electrode and the anode electrode within each cell.

One modification is shown, with a single cell for a small light beam. More cells may be provided, if desired, for a high-power beam of light. Such a multi-cell modification may employ a casing or housing with several compartments, each to contain the components of a cell, with a separate bellows to serve as a reservoir, for each cell, for the electrolyte of the associated compartment and cell.

In order to protect the bellows from being operated by a casual undesired accidental external force, a protective cover is disposed over the bellows to fit snugly over the casing or housing with such frictional engagement over the casing or housing that a positive intended pressure force will be required to move the cover for the bellows.

To provide maximum effective volume and surface area in the cell, in view of the relatively small dimensions, and to enable the cell housing to be manually held as a manipulatable handle for the flashlight, the anode of each cell assembly is shown in a preferred form as a hollow box structure closed at one end and open at its top end, which is provided with a closure through which the communicating conduit extends from the electrolyte bellows reservoir. A porous spacer on each side of the anode separates the anode side walls from two external cathode plates which are connected by a common electrical conductor at one end for connection to one terminal of the external device, which is the flashlight lamp in this case. The other ends of the cathode plates are covered by the cell closure to retain the electrolyte in the cell.

The opening at the top of the compartment of the housing is closed by a unitary cover of a suitable epoxy resin which constitutes the cell closure and serves also as a supporting plate for the bellows associated with the cell. The epoxy resin provides a closed hermetic seal for the housing compartment.

In the single cell unit, the front end of the housing is shaped to embody a space to receive a lamp receptacle with two terminals to which appropriate connections are made from the two end electrodes of the cell. A suitable cap fits over the outer end of the housing to encircle and protect the lamp and carries a lens in the front wall of the cap structure for transmitting the light from the lamp.

As a further safeguard against casual accidental displacement of the cover for the bellows, a tear band is provided around the casing, as a stop to prevent forward movement of the cover to activate and compress the bellows. When the cell is to be activated, the tear band is torn off to free the path into which the cover must be moved to compress the bellows. When the cover is moved to compress the bellows, a detent on the casing holds the cover in its forward position at which the bellows is fully compressed, and thus holds the bellows fully compressed.

The foregoing objects and features of the invention are more fully described in detail in the following specification, taken together with the accompanying drawings, in which FIG. 1 is a vertical longitudinal transverse view in section, with part in elevation, taken through a single cell flashlight of this invention;

FIG. 2 is a vertical longitudinal sectional view, taken along the plane 2—2 indicated in FIG. 1;

FIG. 3 is a plan sectional view transversely taken through the plane indicated by the lines 3—3 in FIG. 2; and FIG. 4 is a transverse sectional view taken along the plane of line 4—4 through the plunger rod in FIG. 1.

Generally speaking the emergency flashlight 10 of this invention consists of a reserve cell shaped to serve as a handle for the associated lamp, and the assembly is made sufficiently economically to be discardable when the energy of the cell is exhausted.

As shown in FIGS. 1 and 2, the flashlight 10 of this invention is constructed to embody a reserve type cell 12 in accordance with this invention, and is shown generally comprising a hollow housing 14 which contains a chamber 16 within which are disposed the elements of said electrical cell 12, consisting of a hollow porous box-shaped anode 18 whose side walls 18A and 18B are spaced from two cathode plates 20A and 20B which are suitably connected by an electrical conductor 22 to constitute the two cathode plates 20A and 20B a unitary potential cathode element.

To enable the cathode plates 20A, 20B and the anode 18 to operate as an electric cell, a suitable electrolyte is necessary between them. The presence of the electrolyte between the cathode and the anode during extended rest conditions could normally result in a chemical action and reaction between the elements, with consequent loss of some or much of the chemical energy that would otherwise be available in electrochemical action during intended use.

One of the features of this invention is that the electrolyte 24 is normally stored in a reservoir 26, which, in one preferred construction, is shaped as a hollow bellows element, within which the electrolyte is normally retained as long as the cell is not to be activated and is merely stored awaiting usage. During such storage time of the cell, the bellows 26 is closed. In construction, the bellows terminates in a conduit 28 at its lower end, which is provided with a frangible closure 30 to provide a hermetic seal for the reservoir 26 and thereby to isolate the electrolyte until the flashlight is to be used.

In order to be able to transfer the electrolyte into the space in the compartment 16 containing the cell electrodes 18 and 20, a plunger 32 is provided and disposed in the bellows 26 to rest on the frangible bottom 30 of the conduit 28 between the bellows and the cell compartment 16, so that a compression force on the bellows 26 will force the plunger 32 downward to fracture the frangible bottom 30 and release the electrolyte 24 so the electrolyte may be forced out of the bellows reservoir 26 into the open space 36 in the hollow anode 18.

The plunger 32 is of cruciform section, as in FIG. 4, to enable liquid electrolyte 24 to flow freely and quickly in the flutes along the shank of the plunger 32, thence into the space 36 within the anode 18, in order to enable the electrolyte to penetrate through the entire surface of the porous anode 18 into the activity space 38 between anode and cathode to enable the cell to function as a primary cell and source of electrical energy.

The plunger 32 is provided with a stop plug 40, of tapered or cork shape, in order to close the top opening 42 in the conduit 28 when the plunger 32 is pressed to its lower-most position corresponding to the maximum compressed position of the bellows 26. At that time, the plug 40 seats tightly into the opening 42 of the conduit and expands the neck of the conduit to cause that neck section of the conduit to tightly engage the wall of the opening in the cell closure 45, to prevent any electrolyte from returning backward up from the cell space into the space 44 around the bellows 26, within the cover cap sleeve 46.

The compression of the bellows is accomplished by said cap or cover 46 which normally fits snugly over the cell housing 14. A small vent hole 48 in said cap cover 46 lets the air pass out of space 44 when the cap is depressed to compress the bellows.

The cap 46 serves also to protect the bellows 26 from being casually or accidentally bumped and compressed, which would result in a fracture of the closing seal 30. The air vent 48 permits the air to pass out from the cell chamber while the electrolyte is being introduced into the cell chamber.

To permit the air initially in the cell to pass out of the cell freely, as the electrolyte is introduced into the cell, the transfer conduit 28 is made to be readily deformable by the plug 40 on the plunger rod 32. In its initial condition, the conduit 28 is slightly spaced from an opening 50 in the cell closure 45 through which the conduit extends. The opening 50 is slightly larger than the outer diameter of the conduit 28 so that the air may pass out freely past the outer surface of the conduit while the electrolyte is being introduced into the cell chamber. When the plug 40 reaches the conduit and expands the conduit to engage the wall of the opening 50, this opening 50 becomes then substantially closed to prevent any free movement of the electrolyte back into the space 44 around the bellows.

In order further to protect the bellows from being compressed by a casual or accidental bump, the frictional contact of the activating cover cap shell 46 alone is not relied on. In addition a tear band 54 is positioned to encircle a lower portion of the housing 14. Said band 54 serves as a stop for a crimped lower end 56 of the cover cap and activating sleeve 46, until said band 54 is torn off and removed. When the tear band 54 is removed, the activating cover cap sleeve 46 may then be depressed to compress the bellows 26, and the crimped lower end of the cover cap activating sleeve 56 is moved downward to pass over a peripheral detent 58 formed on the outer surface of the housing 14. That detent 58 serves to hold the crimped end 56 of the activating cover cap sleeve in locked position against any possibly restoring force in the compressed bellows 26.

The lower end of the housing 14 includes a closed transverse portion 62 with co-axial sleeve 64 that is appropriately internally threaded to receive a threaded shank 66 of a lamp 68. In addition, the lower end of the housing 14 embodies a second annular sleeve portion 70 which extends beyond the detent 58 to serve as a seat to receive a front end cap 72 for supporting a tapered lens 74 to transmit the light beam from the lamp 68.

As shown in FIG. 1, two conductive elements 76 and 78 are imbedded in two protective bosses 82 and 84, which extend backward into the chamber 16 of the cell to cover those two conductors 76 and 78, substantially to the point at which those two conductors 76 and 78 are connected to the anode and to the cathode, respectively, to prevent any short circuiting leakage through the electrolyte which might otherwise engage the two conductors 76 and 78.

After those two terminal conductors 76 and 78 pass through the protective front wall 62 of the housing, they are connected by suitable conductors 80 and 88 to terminals which serve to be engaged by appropriate terminals of the lamp 68.

By means of the construction disclosed, an economical emergency or reserve cell type flashlight is disclosed, which may be stored indefinitely until its use is desired, and then the cell may be easily and readily and quickly rendered active to enable the flashlight to be used immediately. The economy of the design and construction permit the flashlight to be entirely discarded when the cell is used up.

The reason for rendering the reserve cell quickly active is that the desired use may be of an emergency nature. Equally important is the need to introduce the electrolyte quickly so the entire surface of the anode will be wetted and activated at the same time, whereby the anode electrode will be at uni-potential and free from any local interactions between adjoining areas that are not both wetted, with consequent generally uniform wetting of the absorbent spacer to establish uniformity of cell action.

A simple construction has been illustrated as a preferred form, it is to be understood that modifications may be made in the construction of the invention without departing from the spirit and scope of the invention as defined in the claims.

What is claimed is:

1. A portable reserve electric battery cell flashlight device comprising:
   a. an elongated housing having an operating cell compartment, said housing to serve as a handle for said flashlight and of appropriate size and shape to be held in the human hand;
   b. a cathode-anode electrode and separator assembly in said compartment;
   c. a separate container as a reservoir for the electrolyte for said cell wherein said separate container for said electrolyte is shaped as a compressible bellows and is initially filled with a quantity of electrolyte to activate the related cell;
   d. a communicating conduit between said electrolyte container and said cell, said conduit being normally closed to confine the electrolyte to its container;
   e. means for opening said conduit for passage of the electrolyte into said compartment and means for then forcing the electrolyte into the operating region of the associated cell compartment, wherein said means for opening said conduit to said cell consists of a plunger rod operable by said bellows when compressed and said plunger rod embodies a closure element to cork and close said conduit when said bellows is completely compressed, whereby said electrolyte is locked into said cell assembly;
   f. an elongated actuator externally fitting lengthwise of said housing and manually operable lengthwise along said housing to actuate said conduit-opening means;
   g. a tear strip mounted on said housing to prevent undesired movement of said external actuator to compress said bellows until said tear strip is intentionally removed to permit said cell to be activated;

h. and an electric light bulb mounted on said handle and electrically connected to the cathode and anode assembly to be energized therefrom when the electrolyte is introduced into said operating compartment to complete the cell.

2. A reserve electric cell device, as in claim 1, including means for holding said external manual actuator retained in fully operated position.

3. A reserve cell, as in claim 1, in which electrical conductors extend from the cathode and anode elements of the assembly to the terminals of said light bulb;

and said housing embodies means for insulating said electrical conductors to prevent short-circuiting action between said conductors.

4. A reserve electric cell, as in claim 1, in which said housing embodies, on a front portion thereof, a supporting element for said light bulb to enable said light bulb to be inserted therein from in front of said cell;

and a front cover fits over the front end of the housing to surround the light bulb;

and said front cover supports a transparent lens shaped element co-axially in front of said portion for supporting said light bulb.

5. A reserve electric cell, as in claim 1, in which means associated with said communicating conduit between the electrolyte container and said cell, are of such size and shape to assure fast flow of said electrolyte from said electrolyte container into the operating cell compartment.

6. A portable reserve electric battery cell flashlight device comprising;

a. an elongated housing having an operating cell compartment, said housing to serve as a handle for said flashlight and of appropriate size and shape to be held in the human hand;

b. a cathode-anode electrode and separator assembly in said compartment;

c. a separate container as a reservoir for the electrolyte for said cell wherein said separate container for said electrolyte is shaped as a compressible bellows and is initially filled with a quantity of electrolyte to activate the related cell;

d. a communicating conduit between said electrolyte container and said cell, said conduit being normally closed to confine the electrolyte to its container;

e. means for opening said conduit for passage of the electrolyte into said compartment and means for then forcing the electrolyte into the operating region of the associated cell compartment, wherein said means for opening said conduit to said cell consists of a plunger rod operable by said bellows when compressed and said plunger rod embodies a closure element to cork and close said conduit when said bellows is completely compressed, whereby said electrolyte is locked into said cell assembly;

f. an elongated actuator externally fitting lengthwise of said housing and manually operable lengthwise along said housing to actuate said conduit-opening means, wherein said actuator includes means for holding said actuator locked in actuated position to hold said bellows in compressed condition;

g. a tear strip mounted on said housing to prevent undesired movement of said external actuator to compress said bellows until said tear strip is intentionally removed to permit said cell to be activated;

h. and an electric light bulb mounted on said handle and electrically connected to the cathode and anode assembly to be energized therefrom when the electrolyte is introduced into said operating compartment to complete the cell.

7. A portable reserve electric battery cell flashlight device comprising;

a. an elongated housing having an operating cell compartment, said housing to serve as a handle for said flashlight and of appropriate size and shape to be held in the human hand;

b. a cathode-anode electrode and separator assembly in said compartment;

c. a separate container as a reservoir for the electrolyte for said cell wherein said separate container for said electrolyte is shaped as a compressible bellows and is initially filled with a quantity of electrolyte to activate the related cell;

d. a communicating conduit between said electrolyte container and said cell, said conduit being normally closed to confine the electrolyte to its container;

e. means for opening said conduit for passage of the electrolyte into said compartment and means for then forcing the electrolyte into the operating region of the associated cell compartment, wherein said means for opening said conduit to said cell consists of a plunger rod operable by said bellows when compressed and said plunger rod embodies a closure element to cork and close said conduit when said bellows is completely compressed, whereby said electrolyte is locked into said cell assembly;

f. an elongated actuator externally fitting lengthwise of said housing and manually operable lengthwise along said housing to actuate said conduit-opening means;

g. detent means on said housing for engaging and locking said external actuator in fully actuated position;

h. a tear strip mounted on said housing to prevent undesired movement of said external actuator to compress said bellows until said tear strip is intentionally removed to permit said cell to be activated;

i. and an electric light bulb mounted on said handle and electrically connected to the cathode and anode assembly to be energized therefrom when the electrolyte is introduced into said operating compartment to complete the cell.

* * * * *